United States Patent
Karam

(10) Patent No.: US 11,092,802 B2
(45) Date of Patent: Aug. 17, 2021

(54) LIQUID LENS WITH REDUCED CHROMATIC ABERRATION

(71) Applicant: CORNING INCORPORATED, Corning, NY (US)

(72) Inventor: Raymond Miller Karam, Santa Barbara, CA (US)

(73) Assignee: CORNING INCORPORATED, Corning, NY (US)

( * ) Notice: Subject to any disclaimer, the term of this patent is extended or adjusted under 35 U.S.C. 154(b) by 206 days.

(21) Appl. No.: 16/316,526

(22) PCT Filed: Jul. 10, 2017

(86) PCT No.: PCT/US2017/041336
§ 371 (c)(1),
(2) Date: Jan. 9, 2019

(87) PCT Pub. No.: WO2018/013467
PCT Pub. Date: Jan. 18, 2018

(65) Prior Publication Data
US 2019/0293928 A1     Sep. 26, 2019

Related U.S. Application Data

(60) Provisional application No. 62/360,934, filed on Jul. 11, 2016.

(51) Int. Cl.
*G02B 27/00*     (2006.01)
*G02B 26/00*     (2006.01)
(Continued)

(52) U.S. Cl.
CPC .......... *G02B 27/0025* (2013.01); *G02B 3/14* (2013.01); *G02B 5/06* (2013.01); *G02B 26/005* (2013.01);
(Continued)

(58) Field of Classification Search
CPC .......... G02B 27/0025; G02B 2207/115; G02B 26/005; G02B 26/0891; G02B 3/14; G02B 5/06
See application file for complete search history.

(56) References Cited

U.S. PATENT DOCUMENTS 8,400,558 B2   3/2013   Berge et al.
8,699,142 B2   4/2014   Yamamoto et al.
(Continued)

FOREIGN PATENT DOCUMENTS

CN   101685170 A   3/2010
CN   104391345 A   3/2015
(Continued)

OTHER PUBLICATIONS

International Search Report and Written Opinion of the International Searching Authority; PCT/US2017/041336, dated Oct. 16, 2017; 11 Pages; European Patent Office.
(Continued)

*Primary Examiner* — Joseph P Martinez
*Assistant Examiner* — Vipin Patel

(57) ABSTRACT

A liquid lens can include two or more liquids enclosed in a chamber. The liquid lens can be configured to reduce the chromatic aberration produced when the meniscus formed at the interface of two of the liquids is tilted. This can be accomplished in a number of ways including selecting the liquids to maximize the refractive index difference and minimize the Abbe number difference.

19 Claims, 7 Drawing Sheets

(51) Int. Cl.
*G02B 3/14* (2006.01)
*G02B 5/06* (2006.01)
*G02B 26/08* (2006.01)

(52) U.S. Cl.
CPC .... *G02B 26/0891* (2013.01); *G02B 2207/115* (2013.01)

(56) References Cited

U.S. PATENT DOCUMENTS

2006/0256429 A1* 11/2006 Obrebski ............... G02B 15/00
    359/380
2011/0013244 A1   1/2011  Futterer
2011/0188127 A1   8/2011  Yamamoto et al.

FOREIGN PATENT DOCUMENTS

WO      2005088354 A1   9/2005
WO      2011/042835 A1   4/2011

OTHER PUBLICATIONS

Taiwan Patent Application No. 106123159 Office Action dated August 20, 2020; 5 Pages; Taiwan Patent Office.
Terrab et al; "Adaptive Electrowetting Lens-Prism Element", Optics Express, vol. 23, No. 20, 2015, p. 25838-25845.
Chinese Patent Application No. 201780043338.7, Office Action dated Oct. 10, 2020, 31 pages (19 pages of English Translation and 12 pages of Original Document); Chinese Patent Office.

* cited by examiner

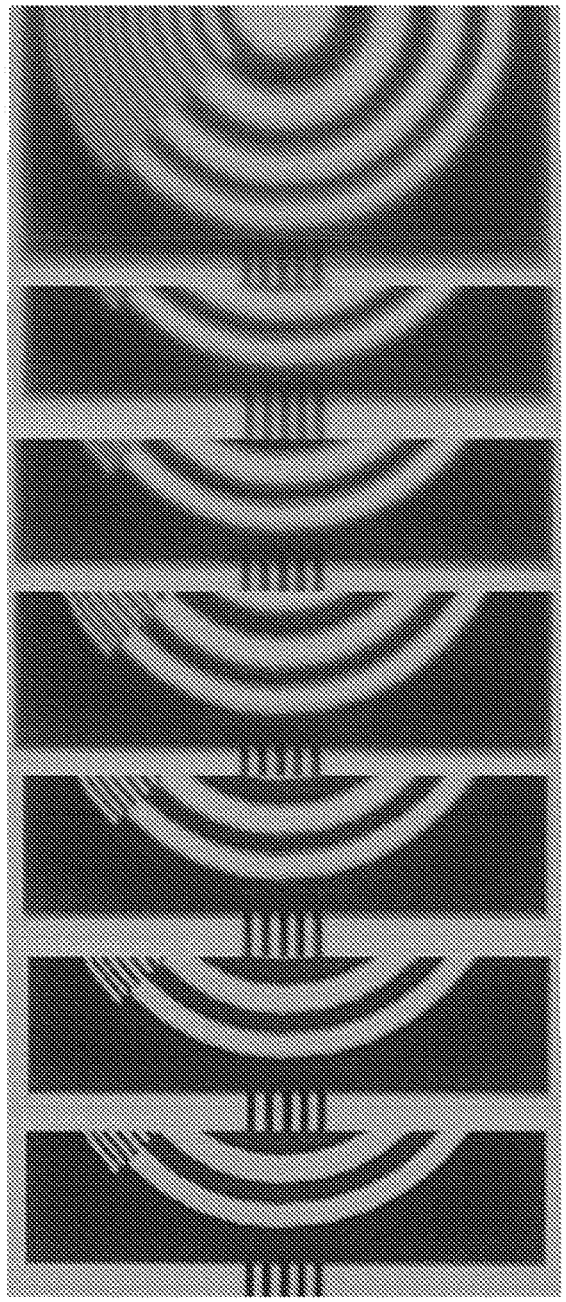
FIG. 1A
*(Conventional)*
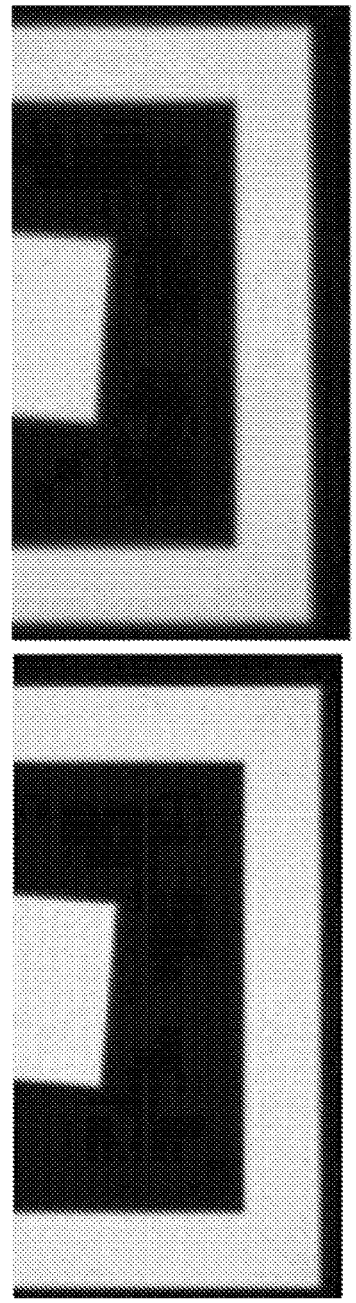
FIG. 1B
*(Conventional)*

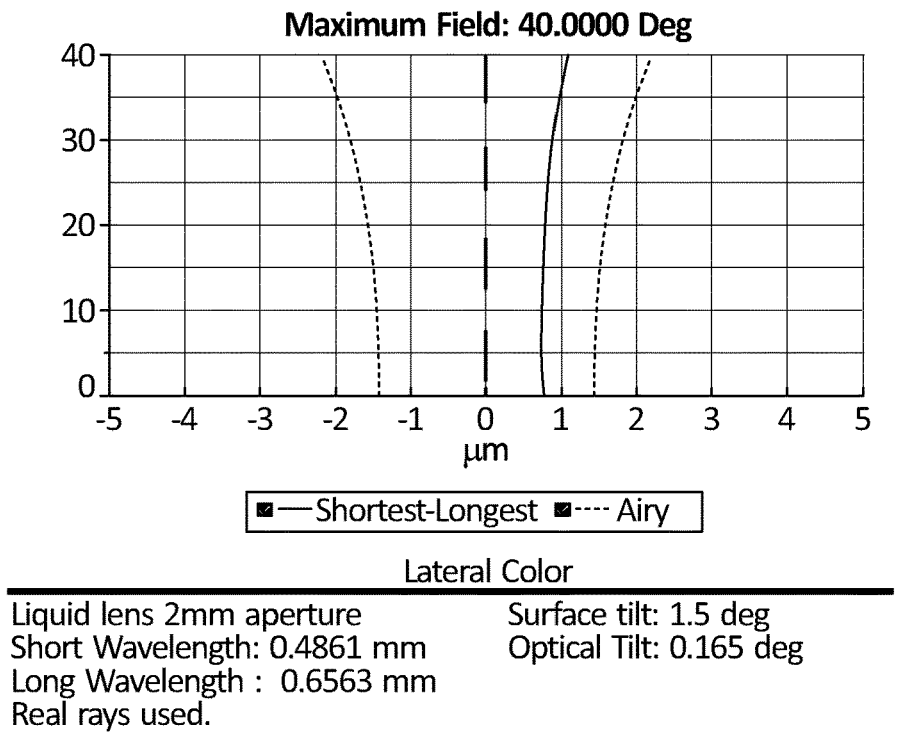
FIG. 2A
*(Conventional)*
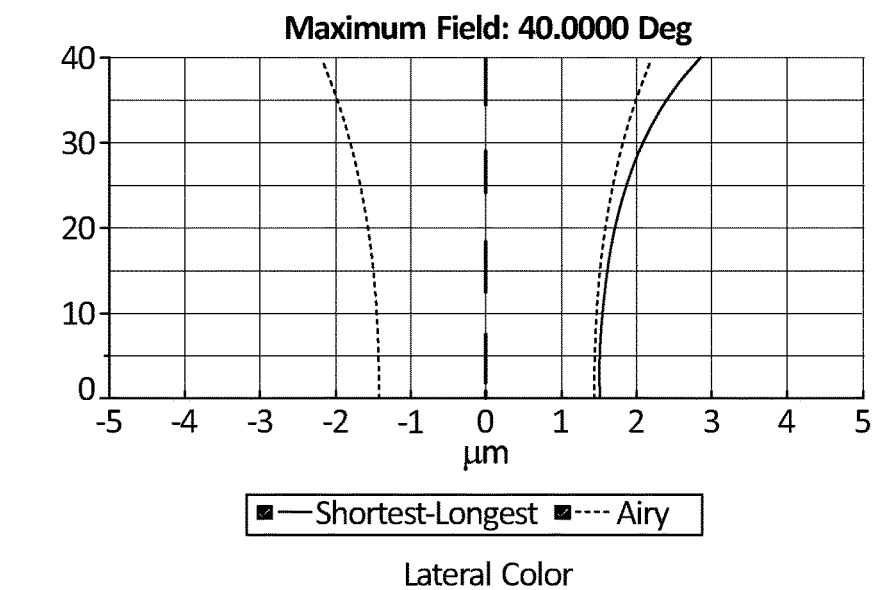
FIG. 2B
*(Conventional)*

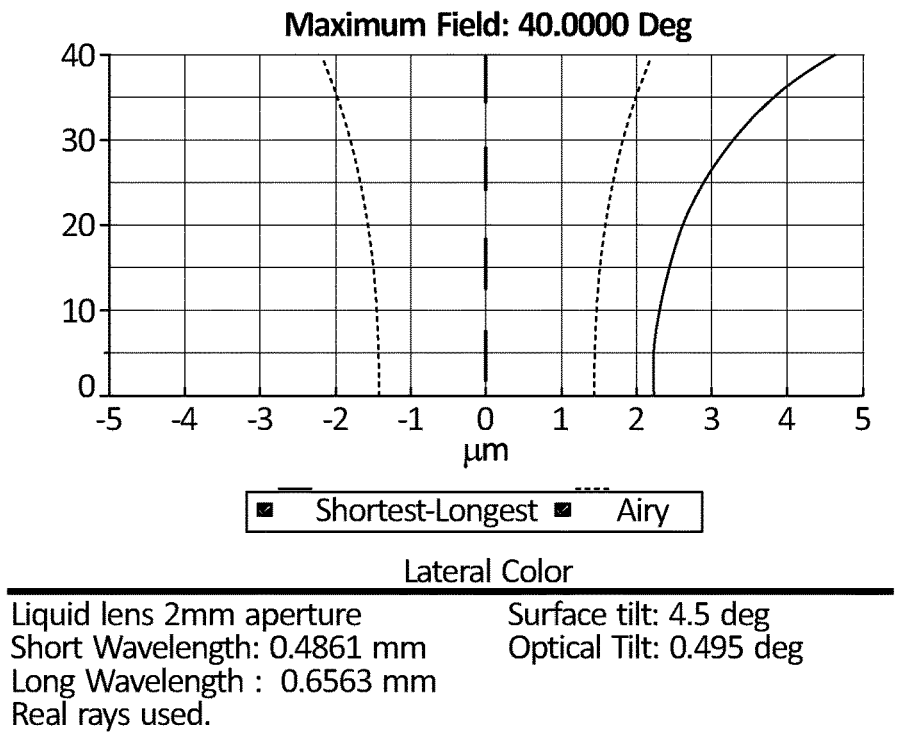
FIG. 2C
*(Conventional)*
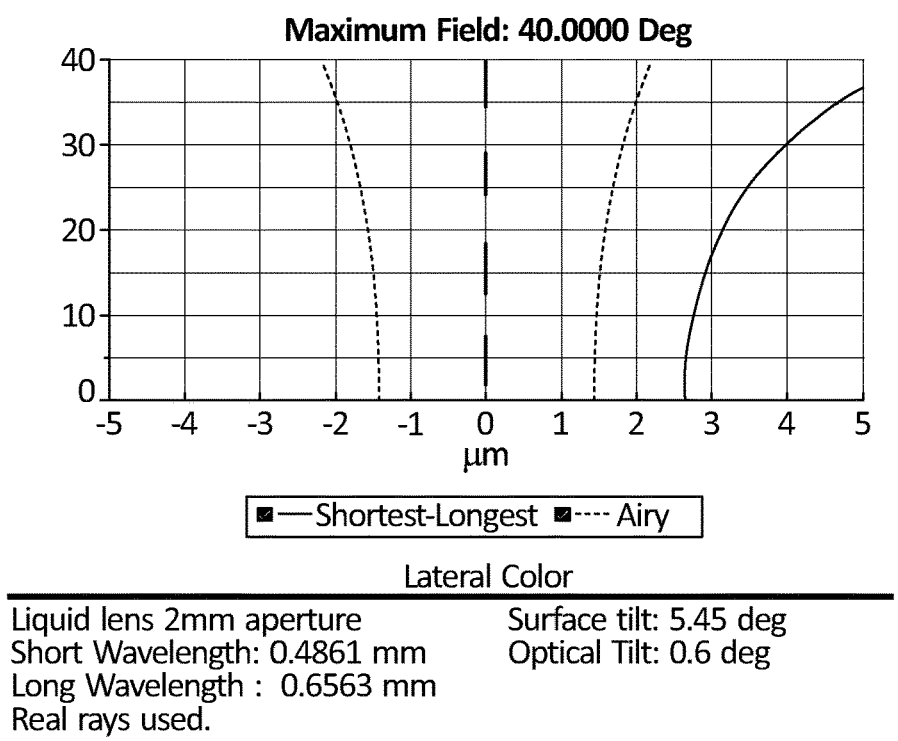
FIG. 2D
*(Conventional)*

Liquid lens 2mm aperture
Short Wavelength: 0.4861 μm
Long Wavelength : 0.6563 μm
Real rays used.

Surface tilt: -14.5; 18.0
Optical Tilt: 0.6

LIQUID LENS WITH REDUCED CHROMATIC ABERRATION

This application claims the benefit of priority under 35 U.S.C. § 371 of International Application No. PCT/US2017/041336, filed on Jul. 10, 2017, which claims the benefit of priority under 35 U.S.C. § 119 of U.S. Provisional Application No. 62/360,934, filed on Jul. 11, 2016, the content of each of which is relied upon and incorporated herein by reference in its entirety.

BACKGROUND

Field

This disclosure relates to a liquid lens with reduced chromatic aberration.

Technical Background

Conventional liquid lenses intrinsically produce spherical chromatic aberration because of the presence of the curved meniscus interface between the two liquids in the liquid lens chamber. Each liquid is characterized by an Abbe number indicative of its chromatic dispersion. In the ideal or reference case, the central vertical axis of the liquid lens chamber is perpendicular to the object plane being imaged. In this situation, the surface tilt angle of the meniscus is zero, the shape of the meniscus is symmetrical about that axis, and there is no chromatic aberration visible in the image.

In practical situations, however, the surface of the meniscus is often tilted at a non-zero angle. This causes the image plane to tilt through a related, generally smaller, angle referred to as the optical tilt angle. The ratio of the optical tilt angle to the surface tilt angle is determined by the difference in refractive index of the two liquids. A non-zero optical tilt angle may significantly increase the chromatic aberration produced by the lens. The chromatic aberration may be particularly problematic when smaller pixel sensors, operable at wavelength diffraction limits, are used to capture the image.

It would be desirable to minimize or at least reduce tilt-induced chromatic aberration in liquid lenses. It would be especially desirable to reduce the chromatic aberration so that it is smaller than the corresponding diffraction limits over the entire expected wavelength range and field of view.

SUMMARY

A number of embodiments are disclosed of a liquid lens configured to reduce chromatic aberration. The liquid lens can include a chamber enclosing a first liquid, a second liquid, and a meniscus formed at the interface of the first liquid and the second liquid. The liquid lens can produce chromatic aberration when the tilt angle of the meniscus changes either passively due to movement of the liquid lens or actively using a controller. The liquid lens can be configured in a number of ways to reduce the chromatic aberration.

In some embodiments, the liquid lens includes two liquids selected, at least in part, on the basis of their refractive indices and/or Abbe numbers. Specifically, the liquids can be selected to increase the difference between the refractive indices of the two liquids and/or decrease the difference between the Abbe numbers of the low liquids. For example, the absolute value of the difference between the refractive indices of the two liquids can be at least 0.13 and/or the absolute value of the difference between the Abbe numbers of the two liquids can be no more than 22. This combination has been found to reduce chromatic aberration caused by physically tilted the meniscus relative to the plane of the object being imaged over an expected wavelength (e.g., 0.4861 microns to 0.6563 microns) for a desired field of view.

In other embodiments, the liquid lens includes three liquids and forms two menisci. The resulting layered arrangement can be configured to minimize chromatic aberration caused by physical tilt of the liquid lens relative to the plane of the object being imaged over an expected wavelength (e.g., 0.4861 microns to 0.6563 microns) for a desired field of view.

In other embodiments, the liquid lens includes a first sub-chamber enclosing two liquids and a second sub-chamber enclosing two liquids. A transparent plate is positioned between the first sub-chamber and the second sub-chamber to separate the two pairs of liquids.

In any of these embodiments, the liquid lens can be configured to reduce chromatic aberration so that it is smaller than the diffraction-limited resolution (Airy disc diameter) over at least a portion of the full field of view and expected wavelength range (e.g., 0.4861 microns to 0.6563 microns) for a given optical tilt (e.g., 0.484 degrees, 0.6 degrees, etc.).

The liquid lens can be used in a variety of applications to reduce chromatic aberration while satisfying standard requirements for reliability, cost, etc, and maintaining the ability of the lens system to meet target values of optical power range. In one application, the liquid lens can be used in front of a camera module to provide optical image stabilization capability without significantly reducing performance—e.g., the modulation transfer function (MTF) shows no significant degradation.

The Summary is provided to introduce a selection of concepts in a simplified form that are further described below in the Detailed Description. The Summary and the Background are not intended to identify key concepts or essential aspects of the disclosed subject matter, nor should they be used to constrict or limit the scope of the claims. For example, the scope of the claims should not be limited based on whether the recited subject matter includes any or all aspects noted in the Summary and/or addresses any of the issues noted in the Background.

DRAWINGS

The preferred and other embodiments are disclosed in association with the accompanying drawings in which:

FIGS. 1A-1B show experimentally observed examples of chromatic aberration in a conventional liquid lens.

FIGS. 2A-2D are graphs showing the simulated chromatic performance of the liquid lens in FIGS. 1A-1B at different optical tilt angles.

DETAILED DESCRIPTION

Figure 3A:
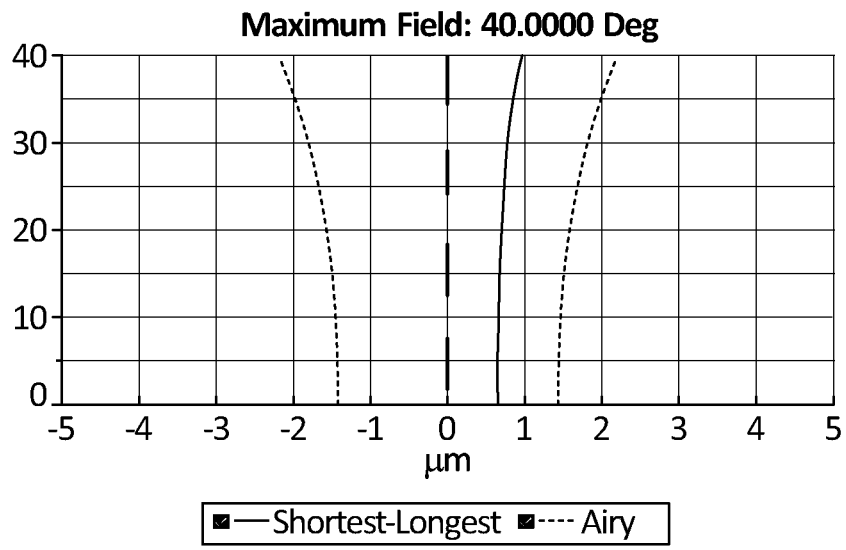
FIGS. 3A-3C are graphs showing the simulated chromatic performance of one embodiment of a liquid lens at different optical tilt angles. The liquid lens includes two liquids having a relatively large refractive index difference and a relatively small Abbe number difference.

A liquid lens uses the principle of electro-wetting to create a fast, programmable optical element. The liquid lens includes a polar liquid (e.g., doped water component) and a non-polar liquid (e.g., a small amount of insulating oil) hermetically sealed between two transparent windows. The polar and non-polar liquids can alternatively be referred to as first and second liquids. The liquids are positioned in a chamber (e.g., a hollow cone structure) coated with a conductor material such as a metal and hydrophobic material such as parylene.

The interface between the two liquids forms a meniscus. Applying a voltage difference between the metal coating and the conducting polar liquid changes the wettability of the non-polar liquid on the hydrophobic material, thereby varying the curvature of the meniscus, and thus, the optical power of the liquid lens. If the liquid lens has four or more electrodes around the circumference, different voltages can be applied to different electrodes, thereby causing the meniscus to tilt. This tilt can be used to compensate for motion (e.g., hand motion in mobile phone applications), which is commonly referred to as optical image stabilization. An example of such a liquid lens can be found in the '558 patent referenced at the end of this document.

Although the tilt of the interface creates a fast response, low power solution for optical image stabilization, it also causes a prismatic effect that angularly separates the wavelengths of the incoming spectral band of the camera. The tilt angle of the meniscus is set to compensate for the center wavelength of the spectral region (e.g., green light). The prism effect causes the shorter wavelengths (e.g., blue light) to be refracted more and the longer wavelengths (e.g., red light) to be refracted less creating chromatic aberration. This chromatic aberration can adversely affect the optical performance (resolution) of the camera module by degrading the modulation transfer function (MTF).

The chromatic aberration produced by physically tilting the meniscus can be reduced using a variety of structures, methods, and techniques. One way to reduce the chromatic aberration is to select liquids having certain properties that have a tendency to minimize the chromatic aberration.

As shown in Examples 3-4 below, chromatic aberration can be reduced by selecting liquids where the absolute value of the difference between the refractive indices of the liquids (i.e., the refractive index difference) is relatively large and the absolute value of the difference between the Abbe number of the liquids (i.e., the Abbe number difference) is relatively small. In general, the chromatic aberration is reduced further as the refractive index difference is increased and/or the Abbe number difference is decreased).

The refractive index difference and the Abbe number difference can be any suitable values that can reduce chromatic aberration. In some embodiments, the refractive index difference is at least 0.13, at least 0.14, or, desirably, at least 0.15. In some embodiments, The Abbe number difference is no more than 22, no more than 20, no more than 17, or, desirably, no more than 15. It should be appreciated that any refractive index difference disclosed above can be used in combination with any Abbe number difference disclosed above.

In some embodiments, the selected liquids can produce chromatic aberration that is less than the diffraction-limited resolution (Airy disc) of the liquid lens over at least a portion of the full field of view and wavelength range of 0.4861 microns to 0.6563 microns for an optical tilt angle of 0.484 degrees relative to an optical object plane. The chromatic aberration can be less than the diffraction-limited resolution over at least a majority of the full field of view of the liquid lens or over at least 75% of the full field of view of the liquid lens.

In other embodiments, the selected liquids can produce chromatic aberration that is less than the diffraction-limited resolution (Airy disc) of the liquid lens over at least a portion of the full field of view and wavelength range of 0.4861 microns to 0.6563 microns for an optical tilt angle of 0.6 degrees relative to an optical object plane. The chromatic aberration can be less than the diffraction-limited resolution over at least a majority of the full field of view of the liquid lens, over at least 75% of the full field of view, or over at least 85% of the full field of view of the liquid lens.

The liquid lens can also include three different liquids enclosed in the chamber a first liquid, a second liquid, and a third liquid. A first or upper meniscus is formed at the interface of the first liquid and the second liquid, and a second or lower meniscus is formed at the interface of the second liquid and the third liquid. The liquid lens effectively forms a "liquid doublet" lens where either one polar liquid is positioned between two non-polar liquids or one non-polar liquid is positioned between two polar liquids. An example of such as configuration is described in Example 5 and shown in FIG. 5.

The first meniscus has a first radius of curvature and the second meniscus has a second radius of curvature. The two radii of curvature can be adjusted by standard electro-wetting methods using leads at the side walls of the liquid lens chamber. In some embodiments, the radii of curvature may be adjusted independently if the leads are appropriately fabricated in split form, so that either meniscus may be concave, convex, or even flat, independently of the other.

In some embodiments, it is possible to achieve asymmetric or aspherical "liquid doublets" by suitable design and operation of the electro-wetting leads and the relative thickness of the three liquid layers. Such a configuration can be advantageous in certain applications.

In some embodiments, a liquid doublet lens may be used to replace at least one solid lens within a lens stack comprising a plurality of lenses. Such an arrangement reduces the height of the lens stack while minimizing chromatic aberration as discussed above.

Figure 7:
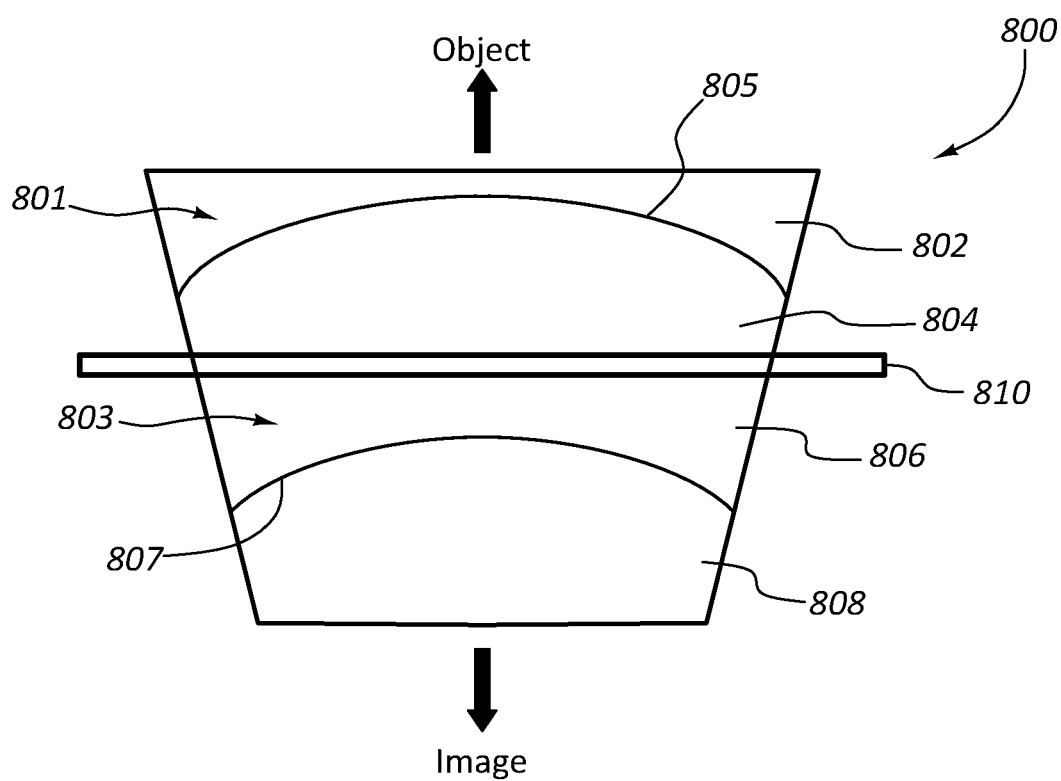
FIG. 7 shows one embodiment of a liquid lens comprising two sub-chambers each of which includes two liquids and a meniscus.

FIG. 7 shows a schematic cross-sectional view of another embodiment of a liquid lens 800 where the chamber is divided into a first or upper sub-chamber 801 and a second or lower sub-chamber 803 by a flat thin transparent plate 810. The first sub-chamber 801 includes a first liquid 802 and a second liquid 804 meeting at a first or upper meniscus 805. The liquids 802, 804 and the meniscus 805 are controlled by electro-wetting leads. The second sub-chamber 803 includes a third liquid 806 and a fourth liquid 808 meeting at a second or lower meniscus 807. The liquids 806, 808 are similarly controlled by electro-wetting leads.

The presence of the intervening transparent plate 810 effectively separates the two liquid pairs and creates a lens stack with the meniscus 805, 807 in each sub-lens able to be independently controlled as desired. It can readily be seen that the idea of two sub-chambers 801, 803 within the liquid lens 800 can be extended to designs including a greater number N of sub-chambers in a stack, separated by N–1 plates.

The liquids 802, 804, 806, 808 in each sub-chamber 801, 803 can be chosen based on a variety of criteria to reduce chromatic aberration. In some embodiments, the liquids 802, 804, 806, 808 are chosen with regard to the refractive index difference and Abbe number difference as discussed above in connection with the liquid lens comprising two liquids. For example, the liquids 802, 804 and the liquids 806, 808 can each be chosen to increase the refractive index difference and/or decrease the Abbe number difference.

In other embodiments, each sub-chamber 801, 803 can include three liquids forming a liquid doublet lens in a manner similar to that disclosed in connection with Example 5 and FIGS. 5-6 below. This design can achieve low chromatic aberration using liquids having more typical values of refractive index difference and Abbe number difference.

EXAMPLES

The following examples are provided to further illustrate the disclosed subject matter. They should not be used to constrict or limit the scope of the claims in any way.

Example 1 (Conventional)

The chromatic aberration produced by a conventional liquid lens was evaluated. The liquid lens included a polar liquid having a refractive index of 1.39 and a non-polar liquid having a refractive index of 1.5. Thus, the refractive index difference was 0.11. The Abbe number difference was 25.

FIG. 1A illustrates the experimentally observed effects of chromatic aberration using a standard test pattern imaged with the liquid lens at optical tilt angles of 0 to 0.6 degrees in 0.1 degree intervals—i.e., 0, 0.1, 0.2, 0.3, 0.4, 0.5, 0.6. Line broadening and blurring increase as the optical tilt increases. These effects become noticeable at 0.2 degrees, serious at 0.4 degrees, and very severe at 0.6 degrees.

FIG. 1B illustrates experimentally observed effects of chromatic aberration using another test object imaged with the liquid lens at optical tilt angles of 0 and 0.6 degrees. Significant image degradation is clearly visible at 0.6 degrees of optical tilt.

Example 2 (Conventional)

The chromatic performance of the conventional liquid lens in Example 1 was simulated for four different situations where the lens was physically tilted 1.5 degrees, 3 degrees, 4.5 degrees, and 5.45 degrees. The physical tilt of the liquid lens caused a corresponding optical tilt of 0.165 degrees, 0.33 degrees, 0.495 degrees, and 0.6 degrees, respectively. The results are shown in the graphs in FIGS. 2A-2D.

The solid line in the graphs is the calculated chromatic aberration—i.e., the difference between the location of the focal points of light having wavelengths of 0.4861 μm and 0.6563 μm plotted against the optical field angle. The x-axis is the calculated chromatic aberration and the y-axis is the optical field angle. Each graph also shows dotted "Airy" disc lines indicating the corresponding minimum resolvable feature size due to diffraction (i.e., the diffraction-limited resolution), which was determined by the wavelengths and the f-number of the lens.

FIG. 2A shows the calculated chromatic aberration of the liquid lens at a small surface tilt angle of 1.5 degrees, which caused an optical tilt of 0.165 degrees. The chromatic aberration line is fully within the bounds of the Airy disc lines meaning that chromatic aberration is negligible.

FIG. 2B shows the calculated chromatic aberration of the liquid lens at a surface tilt angle of 3 degrees, which caused an optical tilt of 0.33 degrees. The chromatic aberration line is on top of the Airy disc lines near the center of the image and extends outside of the Airy disc lines by an increasing amount as the edges of the image are approached. This means that chromatic aberration may be negligible at the center of images formed by the tilted liquid lens but is increasingly visible near the edges.

FIG. 2C shows the calculated chromatic aberration of the liquid lens at a surface tilt angle of 4.5 degrees, which caused an optical tilt of 0.495 degrees. The chromatic aberration line is outside the Airy disc lines throughout the field of view meaning that chromatic aberration is noticeable even at the image center (at y=0) and worsens as the maximum field of view is approached.

FIG. 2D shows the calculated chromatic aberration of the liquid lens at a surface tilt of 5.45 degrees, which causes an optical tilt of 0.6 degrees. The chromatic aberration line is even further outside the Airy disc lines suggesting even worse image degradation through the entire field of view.

The simulated results are consistent with the experimental observations in Example 1.

Example 3

The chromatic performance of a liquid lens having a refractive index difference of 0.1613 and an Abbe number difference of 18.5 was simulated for three different situations where the lens was physically tilted 1.5 degrees, 3 degrees, and 3.7 degrees. The physical tilt of the liquid lens caused a corresponding optical tilt of 0.242 degrees, 0.484 degrees, and 0.6 degrees, respectively. The results are shown in the graphs in FIGS. 3A-3C.

FIG. 3A shows the calculated chromatic aberration of the liquid lens at a small surface tilt angle of 1.5 degrees, which caused an optical tilt of 0.242 degrees. The chromatic aberration line is well within the Airy disc lines for the liquid lens meaning that chromatic aberration is negligible.

Figure 3B:
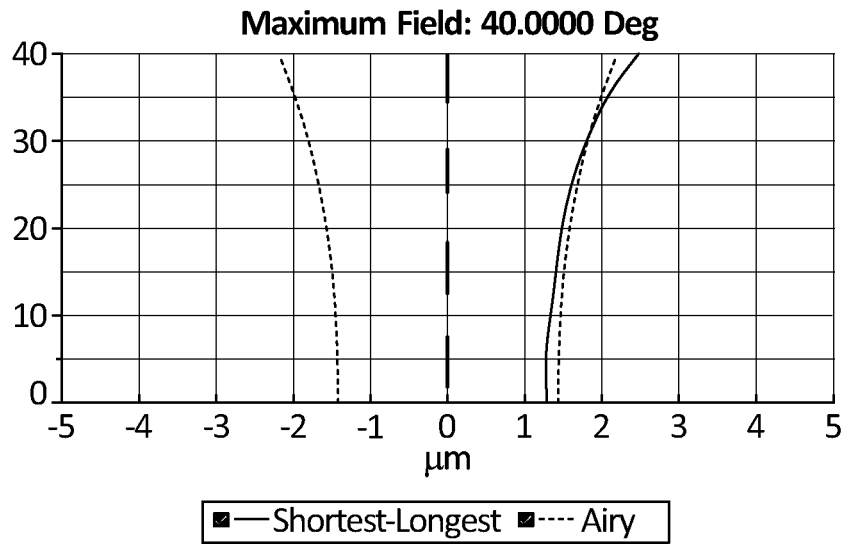

FIG. 3B shows the calculated chromatic aberration of the liquid lens at a surface tilt angle of 3 degrees, which caused an optical tilt of 0.484 degrees. The chromatic aberration line is within the Airy disc lines through most of the field and just crosses slightly over the Airy disc lines near the edges of the image. This means that chromatic aberration effects are only visible near the edge of the images and should be minor even there.

Figure 3C:
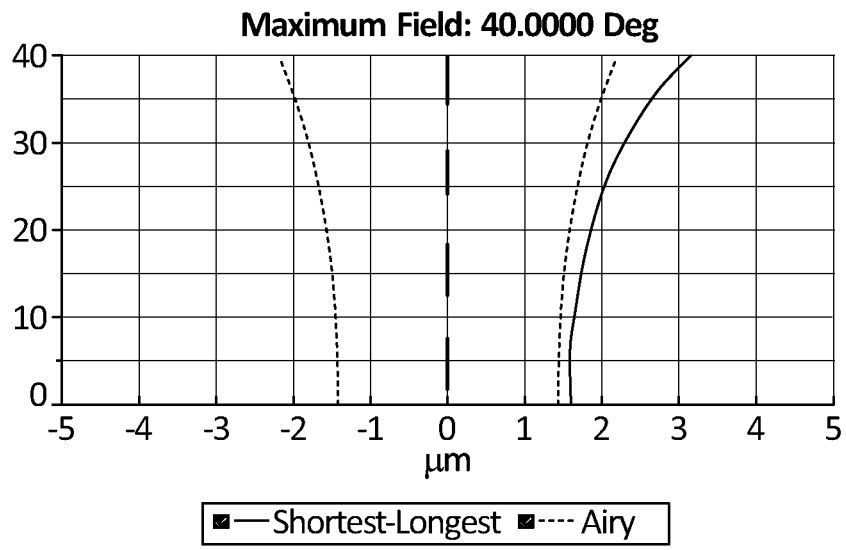

FIG. 3C shows the calculated chromatic aberration of the liquid lens at a surface title angle of 3.7 degrees, which caused an optical tilt of 0.6 degrees. The chromatic aberration line is slightly outside the Airy boundary lines for most of the image field and gets slightly worse as the edges are approached.

A comparison of this Example and Example 2 show that the chromatic performance of a liquid lens having a larger refractive index difference (0.1613) and a smaller Abbe number difference (18.5) is significantly better than a conventional liquid lens having a smaller refractive index difference (0.11) and a higher Abbe number difference (25).

Example 4

Figure 4:
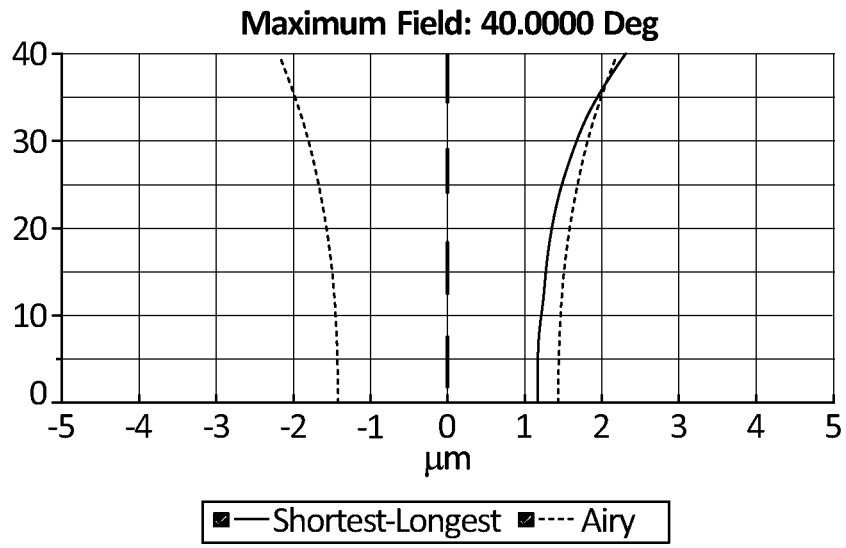
FIG. 4 is a graph showing the simulated chromatic performance of another embodiment of a liquid lens at an optical tilt angle of 0.6 degrees. The liquid lens includes two liquids having an even larger refractive index difference and smaller Abbe number difference than the liquid lens in FIGS. 3A-3C.

The chromatic performance of a liquid lens having a refractive index difference of 0.168 and an Abbe number difference of 12.5 was simulated for a situation where the lens was physically tilted 3.6 degrees, which caused a corresponding optical tilt of 0.6 degrees. The results are shown in the graph in FIG. 4. The chromatic aberration line is within the Airy disc lines for almost the entire field of view meaning that chromatic aberration effects are only visible, if at all, near the edge of the images.

This also indicates that the chromatic performance of the liquid lens should further improve if liquids are used that have even larger refractive index differences and/or smaller Abbe number differences.

Example 5

Figure 5:
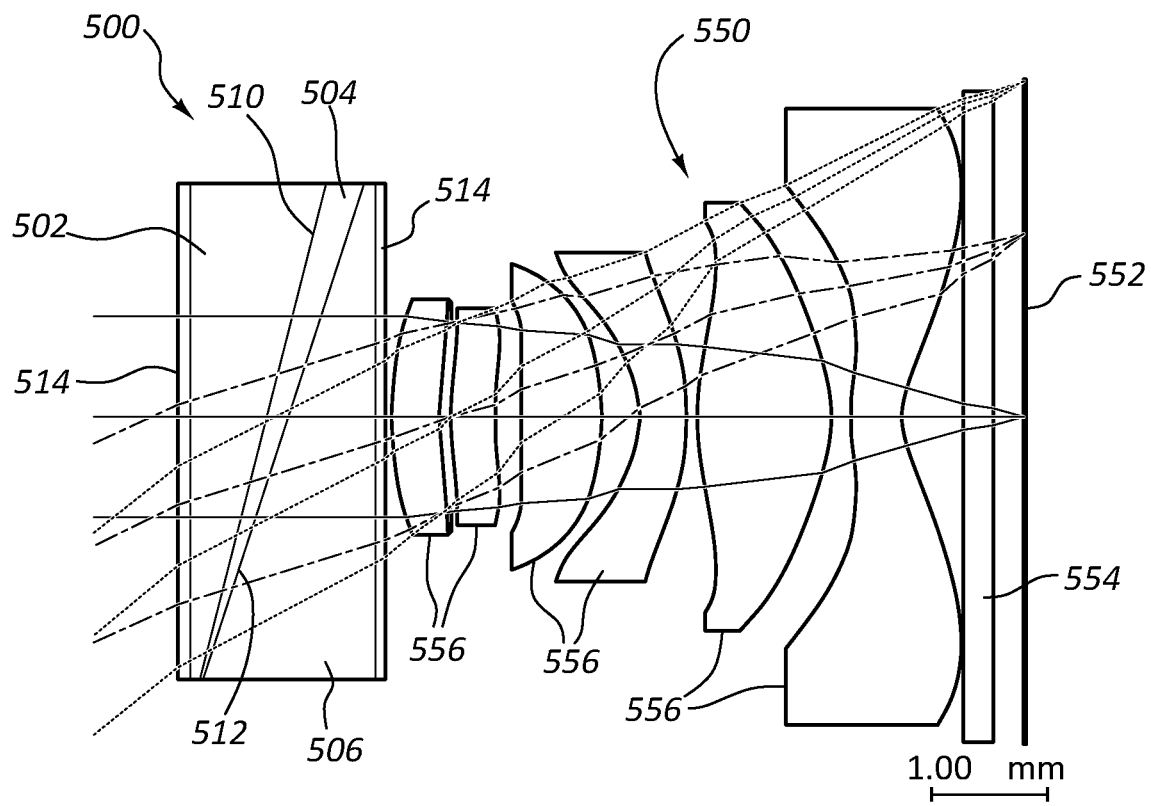
FIG. 5 shows one embodiment of a lens stack including a liquid lens comprising three liquids and two menisci and having an optical tilt angle of 0.6 degrees.
Figure 6:
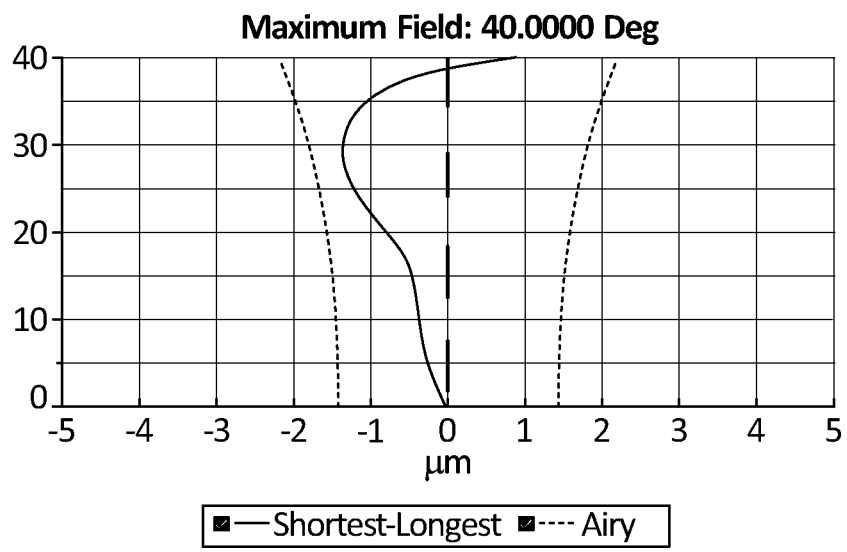
FIG. 6 is a graph showing the simulated chromatic performance of the liquid lens in FIG. 5.

The chromatic performance of a liquid lens 500 including three liquids as shown in FIG. 5 was simulated. The liquid lens 500 includes a first liquid 502, a second liquid 504, and a third liquid 506 all of which were different. The liquid lens 500 was simulated as part of a lens stack 550 including an image sensor 552, IR cut filter 554, and a plurality of solid lenses 556. The covers or windows 514 of the liquid lens 500 are simulated as NBK7 Schott glass.

The liquid lens 500 includes a first meniscus 510 at the interface of the first liquid 502 and the second liquid 504 and a second meniscus 512 at the interface of the second liquid 504 and the third liquid 506. The liquids 502, 504, 506 have refractive indices of 1.389, 1.5, and 1.38 and Abbe numbers of 58.6, 33.7, and 45.7, respectively. The refractive index difference and the Abbe number difference between the first liquid 502 and the second liquid 504 was 0.111 and 24.9, respectively, which was almost the same as the liquids in the conventional liquid lens in Example 1. The refractive index difference and the Abbe number difference between the second liquid 504 and the third liquid 506 was 0.11 and 12, respectively.

The first meniscus 510 was physically tilted 14.5 degrees and the second meniscus 512 was tilted 18 degrees, which caused an optical tilt of 0.6 degrees. As shown in FIG. 6, the chromatic aberration line is within the Airy disc lines through the full image field. Chromatic aberration effects should be dramatically reduced in the liquid lens 500 and other liquid lenses having a similar arrangement. It should also be noted that the reduced chromatic aberration was achieved using similar liquids as those found in the conventional liquid lens in Example 1.

Illustrative Embodiments

Reference is made in the following to several illustrative embodiments of the disclosed subject matter. The following embodiments illustrate only a few selected embodiments that may include one or more of the various features, characteristics, and advantages of the disclosed subject matter. Accordingly, the following embodiments should not be considered as being comprehensive of all the possible embodiments.

In one embodiment, a method of providing a low chromatic aberration liquid lens comprises selecting for use in the liquid lens a pair of first and second liquids characterized by first and second refractive indices and by first and second Abbe numbers, the pair of liquids being additionally characterized by a difference DeltaN between the first and second refractive indices and a difference DeltaVd between the first and second Abbe numbers. Selecting the pair of first and second liquids can comprise calculating an Airy line plot of bounding diffraction-limit values characterizing the liquid lens over the desired field of view and expected wavelength range; for a predetermined optical tilt of the lens relative to an optical object plane, calculating for each of a plurality of pairs of difference values DeltaN and DeltaVd a corresponding plot of liquid lens chromatic aberration as a function of field distance from the image center, wherein the chromatic aberration is the maximum difference between focal point locations for wavelengths bounding the expected wavelength range; determining from the plurality of plots a pair of difference values $DeltaN_O$ and $DeltaVd_O$ for which the absolute value of chromatic aberration remains less than the absolute value of the diffraction limit value at the same field distance, throughout the desired field of view; and selecting a pair of first and second liquids characterized by $DeltaN_O$ and $DeltaVd_O$ for use in the liquid lens. 2. $DeltaN_O$ can be greater than or equal to 0.13.

In another embodiment, a method of providing a low chromatic aberration liquid lens comprising first, second and third liquids to be enclosed in a lens chamber, wherein either the first and third liquids are polar and the third liquid is non-polar, or the first and third liquids are non-polar and the second liquid is polar; the method comprises assembling the liquid lens such that the lens chamber encloses the first, second and third liquids in a layered arrangement, the first liquid overlying the second liquid to form an upper meniscus, and the second liquid overlying the third liquid to form a lower meniscus. The upper meniscus and lower meniscus can be independently controlled.

In another embodiment, a low chromatic aberration liquid lens comprises a chamber enclosing first and second liquids, the first liquid being characterized by a first refractive index and a first Abbe number, and the second liquid being characterized by a second refractive index and a second Abbe number, wherein chromatic aberration caused by the liquid lens is less than the diffraction-limited resolution of the liquid lens over a desired field of view and expected wavelength range for a predetermined optical tilt of the liquid lens relative to an optical object plane. The predetermined optical tilt can be caused by a physical tilt of the liquid lens and/or lens system relative to the optical object plane of greater than 3 degrees.

In another embodiment, a low chromatic aberration liquid lens comprises a chamber enclosing first, second, and third liquids, the first liquid directly overlying the second liquid to form an upper meniscus and the second liquid directly overlying the third liquid to form a lower meniscus, wherein either the first and third liquids are polar and the second liquid is non-polar, or the first and third liquids are non-polar and the second liquid is polar.

In another embodiment, a liquid lens comprising a chamber comprises an upper sub-chamber enclosing first and second liquids, a lower sub-chamber enclosing third and fourth liquids, and a transparent plate positioned between the upper and lower sub-chambers, wherein chromatic aberration caused by the liquid lens is less than the diffraction-limited resolution of the liquid lens over a desired field of view and expected wavelength range for a predetermined optical tilt of the liquid lens relative to an optical object plane.

In another embodiment, a liquid lens comprises a chamber comprising a plurality of sub-chambers separated by transparent plates, wherein at least one of the plurality of sub-chambers comprises first, second, and third liquids in a layered arrangement, the first liquid overlying the second liquid to form an upper meniscus, and the second liquid overlying the third liquid to form a lower meniscus.

Terminology and Interpretative Norms

The term "chromatic aberration" means the maximum difference between focal point locations for wavelengths bounding a determined wavelength range. Such difference can be described as lateral chromatic shift or color splitting in an image.

Any methods described in the claims or specification should not be interpreted to require the steps to be performed in a specific order unless stated otherwise. Also, the methods should be interpreted to provide support to perform the recited steps in any order unless stated otherwise.

Spatial or directional terms, such as "left," "right," "front," "back," and the like, relate to the subject matter as it is shown in the drawings. However, it is to be understood that the described subject matter may assume various alternative orientations and, accordingly, such terms are not to be considered as limiting.

Articles such as "the," "a," and "an" can connote the singular or plural. Also, the word "or" when used without a preceding "either" (or other similar language indicating that "or" is unequivocally meant to be exclusive e.g., only one of x or y, etc.) shall be interpreted to be inclusive (e.g., "x or y" means one or both x or y).

The term "and/or" shall also be interpreted to be inclusive (e.g., "x and/or y" means one or both x or y). In situations where "and/or" or "or" are used as a conjunction for a group of three or more items, the group should be interpreted to include one item alone, all the items together, or any combination or number of the items.

The terms have, having, include, and including should be interpreted to be synonymous with the terms comprise and comprising. The use of these terms should also be understood as disclosing and providing support for narrower alternative embodiments where these terms are replaced by "consisting" or "consisting essentially of."

Unless otherwise indicated, all numbers or expressions, such as those expressing dimensions, physical characteristics, and the like, used in the specification (other than the claims) are understood to be modified in all instances by the term "approximately." At the very least, and not as an attempt to limit the application of the doctrine of equivalents to the claims, each numerical parameter recited in the specification or claims which is modified by the term "approximately" should be construed in light of the number of recited significant digits and by applying ordinary rounding techniques.

All disclosed ranges are to be understood to encompass and provide support for claims that recite any and all subranges or any and all individual values subsumed by each range. For example, a stated range of 1 to 10 should be considered to include and provide support for claims that recite any and all subranges or individual values that are between and/or inclusive of the minimum value of 1 and the maximum value of 10; that is, all subranges beginning with a minimum value of 1 or more and ending with a maximum value of 10 or less (e.g., 5.5 to 10, 2.34 to 3.56, and so forth) or any values from 1 to 10 (e.g., 3, 5.8, 9.9994, and so forth).

All disclosed numerical values are to be understood as being variable from 0-100% in either direction and thus provide support for claims that recite such values or any and all ranges or subranges that can be formed by such values. For example, a stated numerical value of 8 should be understood to vary from 0 to 16 (100% in either direction) and provide support for claims that recite the range itself (e.g., 0 to 16), any subrange within the range (e.g., 2 to 12.5) or any individual value within that range (e.g., 15.2).

The drawings shall be interpreted as illustrating one or more embodiments that are drawn to scale and/or one or more embodiments that are not drawn to scale. This means the drawings can be interpreted, for example, as showing: (a) everything drawn to scale, (b) nothing drawn to scale, or (c) one or more features drawn to scale and one or more features not drawn to scale. Accordingly, the drawings can serve to provide support to recite the sizes, proportions, and/or other dimensions of any of the illustrated features either alone or relative to each other. Furthermore, all such sizes, proportions, and/or other dimensions are to be understood as being variable from 0-100% in either direction and thus provide support for claims that recite such values or any and all ranges or subranges that can be formed by such values.

The terms recited in the claims should be given their ordinary and customary meaning as determined by reference to relevant entries in widely used general dictionaries and/or relevant technical dictionaries, commonly understood meanings by those in the art, etc., with the understanding that the broadest meaning imparted by any one or combination of these sources should be given to the claim terms (e.g., two or more relevant dictionary entries should be combined to provide the broadest meaning of the combination of entries, etc.) subject only to the following exceptions: (a) if a term is used in a manner that is more expansive than its ordinary and customary meaning, the term should be given its ordinary and customary meaning plus the additional expansive meaning, or (b) if a term has been explicitly defined to have a different meaning by reciting the term followed by the phrase "as used in this document shall mean" or similar language (e.g., "this term means," "this term is defined as," "for the purposes of this disclosure this term shall mean," etc.). References to specific examples, use of "i.e.," use of the word "invention," etc., are not meant to invoke exception (b) or otherwise restrict the scope of the recited claim terms. Other than situations where exception (b) applies, nothing contained in this document should be considered a disclaimer or disavowal of claim scope.

The subject matter recited in the claims is not coextensive with and should not be interpreted to be coextensive with any embodiment, feature, or combination of features described or illustrated in this document. This is true even if only a single embodiment of the feature or combination of features is illustrated and described in this document.

INCORPORATION BY REFERENCE

The entire contents of each of the documents listed below are incorporated by reference into this document. If the same term is used in both this document and one or more of the incorporated documents, then it should be interpreted to have the broadest meaning imparted by any one or combination of these sources unless the term has been explicitly defined to have a different meaning in this document. If there is an inconsistency between any of the following documents and this document, then this document shall govern. The incorporated subject matter should not be used to limit or narrow the scope of the explicitly recited or depicted subject matter.

U.S. Prov. App. No. 62/360,934, titled "Liquid Lens with Reduced Chromatic Aberration," filed on 11 Jul. 2016.

U.S. Pat. No. 8,400,558 (application Ser. No. 12/746,934), titled "Image Stabilization Circuitry for Liquid Lens," filed on 12 Dec. 2008, issued on 19 Mar. 2013 (the '558 patent).

The invention claimed is:

1. A liquid lens comprising:
a chamber; and
liquids consisting essential of a first liquid and a second liquid, both the first liquid and the second liquid being positioned in the chamber with a meniscus formed at an interface of the first liquid and the second liquid;

wherein the meniscus is tilted at a non-zero angle that causes an image plane to tilt at a non-zero optical tilt angle relative to an optical object plane;

wherein the first liquid has a first refractive index and a first Abbe number, and the second liquid has a second refractive index and a second Abbe number;

wherein an absolute value of a difference between the first refractive index and the second refractive index is at least 0.13;

wherein an absolute value of a difference between the first Abbe number and the second Abbe number is no more than 22; and wherein a chromatic aberration that the liquid lens produces is less than a diffraction-limited resolution that the liquid lens produces over at least a portion of a full field of view and a wavelength range of 0.4861 microns to 0.6563 microns when the optical tilt angle is 0.484 degrees relative to the optical object plane.

2. The liquid lens of claim 1 wherein the absolute value of the difference between the first refractive index and the second refractive index is at least 0.15.

3. The liquid lens of claim 1 wherein the absolute value of the difference between the first Abbe number and the second Abbe number is no more than 17.

4. The liquid lens of claim 1 wherein the absolute value of the difference between the first Abbe number and the second Abbe number is no more than 15.

5. The liquid lens of claim 1 wherein one of the first liquid or the second liquid is a polar liquid and the other one of the first liquid or the second liquid is a non-polar liquid.

6. A liquid lens comprising:
a chamber; and
liquids comprising a first liquid, a second liquid, and a third liquid positioned in the chamber, with a first meniscus formed at an interface of the first liquid and the second liquid and a second meniscus formed at an interface of the second liquid and the third liquid;
wherein the first meniscus and the second meniscus are tilted at non-zero angles that cause an image plane to tilt at a non-zero optical tilt angle relative to an optical object plane; and
wherein the chromatic aberration that the liquid lens produces is less than the diffraction-limited resolution of the liquid lens over at least a portion of the full field of view and the wavelength range of 0.4861 microns to 0.6563 microns when the optical tilt angle is 0.6 degrees relative to the optical object plane.

7. The liquid lens of claim 6 wherein;
the first liquid, the second liquid, and the third liquid are all different.

8. The liquid lens of claim 7 wherein the chromatic aberration is less than the diffraction-limited resolution over at least a majority of the full field of view of the liquid lens.

9. The liquid lens of claim 7 wherein the chromatic aberration is less than the diffraction-limited resolution over at least 75% of the full field of view of the liquid lens.

10. The liquid lens of claim 7 wherein the chromatic aberration is less than the diffraction-limited resolution over the full field of view of the liquid lens.

11. The liquid lens of claim 7 wherein
(a) the first liquid and the third liquid are polar liquids and the second liquid is a non-polar liquid; or
(b) the first liquid and the third liquid are non-polar liquids and the second liquid is a polar liquid.

12. The liquid lens of claim 7 wherein a tilt of the first meniscus and a tilt of the second meniscus are capable of being independently controlled.

13. The liquid lens of claim 6, wherein
the first liquid, the second liquid, and the third liquid all have an index of refraction and an Abbe number;
the index of refraction of the second liquid is greater than (i) the index of refraction of the first liquid and (ii) the index of refraction of the third liquid; and
the Abbe number of the second liquid is less than (i) the Abbe number of the first liquid and (ii) the Abbe number of the third liquid.

14. A liquid lens comprising:
a chamber;
a transparent plate within the chamber dividing the chamber into a first sub-chamber and a second sub-chamber;
a first liquid and a second liquid within the first sub-chamber with a meniscus formed at an interface of the first liquid and the second liquid; and
a third liquid and a fourth liquid within the second sub-chamber with another meniscus formed at another interface of the third liquid and the fourth liquid;
wherein the meniscuses are tilted at non-zero angles that cause an image plane to tilt at a non-zero optical tilt angle relative to an optical object plane; and
wherein a chromatic aberration that the liquid lens produces is less than a diffraction-limited resolution that the liquid lens produces over at least a portion of a full field of view and a wavelength range of 0.4861 microns to 0.6563 microns when the optical tilt angle is 0.484 degrees relative to the optical object plane.

15. The liquid lens of claim 14 wherein the chromatic aberration is less than the diffraction-limited resolution over at least a majority of the full field of view of the liquid, lens.

16. The liquid lens of claim 14 wherein the chromatic aberration is less than the diffraction-limited resolution over at least 75% of the full field of view of the liquid lens.

17. The liquid lens of claim 14 wherein an absolute value of a difference between a first refractive index of the first liquid and a second refractive index of the second liquid is at least 0.14.

18. The liquid lens of claim 14 wherein one of the first liquid or the second liquid is a polar liquid and the other one of the first liquid or the second liquid is a non-polar liquid.

19. The liquid lens of claim 14 wherein:
the chromatic aberration that the liquid lens produces is less than the diffraction-limited resolution that the liquid lens produces over at least a portion of the full field of view and the wavelength range of 0.4861 microns to 0.6563 microns when the optical tilt angle is 0.6 degrees relative to the optical object plane.

* * * * *